(12) United States Patent
Yeon

(10) Patent No.: US 6,560,186 B2
(45) Date of Patent: *May 6, 2003

(54) APPARATUS AND METHOD WITH A DRIVING MECHANISM FOR OPENING A SHUTTER OF A CARTRIDGE

(75) Inventor: Cheol-sung Yeon, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,489

(22) Filed: Nov. 17, 1998

(65) Prior Publication Data

US 2001/0012256 A1 Aug. 9, 2001

(30) Foreign Application Priority Data

Dec. 2, 1997 (KR) .............................. 97-65304

(51) Int. Cl.[7] .............................. G11B 33/02
(52) U.S. Cl. ..................................... 369/77.2
(58) Field of Search ................ 360/133; 378/160; 369/30, 34, 178, 75.1, 75.2, 77.1, 77.2

(56) References Cited

U.S. PATENT DOCUMENTS

| 5,539,717 A | * | 7/1996 | Choi | 369/75.2 |
| 5,646,926 A | * | 7/1997 | Handa et al. | 369/77.2 |
| 5,799,009 A | * | 8/1998 | Takahashi et al. | 369/291 |
| 5,812,511 A | * | 9/1998 | Kawamura et al. | 369/77.2 |
| 5,867,338 A | * | 2/1999 | Ohira et al. | 360/75.2 |
| 5,907,535 A | * | 5/1999 | Takahashi et al. | 369/291 |
| 5,914,929 A | * | 6/1999 | Kato et al. | 369/75.2 |
| 5,963,529 A | * | 10/1999 | Kabasawa | 360/77.2 |
| 6,108,299 A | * | 8/2000 | Kano et al. | 369/291 |

FOREIGN PATENT DOCUMENTS

JP       08167212 A   *   6/1996

* cited by examiner

Primary Examiner—Hoa T. Nguyen
Assistant Examiner—Tianjie Chen
(74) Attorney, Agent, or Firm—Staas & Halsey LLP

(57) ABSTRACT

A shutter opening apparatus and method for opening a shutter of a cartridge outside an optical disc recording and reproducing apparatus. The shutter opening apparatus includes an opening section mounted on a longitudinal opening of a tray for opening the shutter, a feeding section moved by the opening section for feeding the tray into an inner portion of the optical disc recording and reproducing apparatus, and a driving section for driving the opening section and the feeding section. The opening section includes a worm shaft rotatably mounted across the longitudinal opening, a first bevel gear rotated by the driving section and which is engaged with the worm shaft, and a bracket moved by the worm shaft for opening the shutter. The feeding section is movably installed on the tray and includes a slide bar moved between a first and second positions by the bracket, and a bias spring disposed between the try and the slide bar to bias the slide bar toward the first position. At one end of the slide bar, a rack to be engaged with the driving section is formed. The driving section includes a motor for generating a driving power, a second bevel gear rotated by the motor and engaged with the first bevel gear when the slide bar is at the second position, and a loading gear engaged with the rack when the slide bar is at the second position. The shutter of the cartridge is opened without failure outside the optical disc recording and reproducing apparatus, so the optical disc recording and reproducing device has a smaller size, and the loading errors of the disc are prevented.

20 Claims, 7 Drawing Sheets

APPARATUS AND METHOD WITH A DRIVING MECHANISM FOR OPENING A SHUTTER OF A CARTRIDGE

CROSS-REFERENCE TO RELATED APPLICATIONS

This application claims the benefit of Korean Application No. 97-65304, filed Dec. 2, 1997, in the Korean Patent Office, the disclosure of which is incorporated herein by reference.

BACKGROUND OF THE INVENTION

1. Field of the Invention

The present invention relates to an apparatus and method for opening the shutter of a cartridge of an optical disc recording and reproducing device, and more particulary, to an opening apparatus for opening the shutter of the cartridge before the cartridge is advanced into the optical disc recording and reproducing device.

2. Description of the Related Art

An optical disc D such as Digital Versatile Disc (DVD) is a recording medium on which information is recorded/reproduced by a recording and reproducing apparatus. The information is recorded/reproduced to/from concentric tracks of the disc D. Such an optical disc is loaded on a turntable by a disc loading device, thereby enabling rotation by a rotating device. While the optical disc D is being rotated, an optical pick-up device travels in a radial direction of the optical disc D and projects a laser beam onto the disc track. As a result, the information is recorded/reproduced to/from the disc.

FIG. 1 shows a conventional optical disc recording/reproducing apparatus, and FIG. 2 shows a shutter opening apparatus of a conventional cartridge. As shown in the figures, the conventional optical disc recording/reproducing apparatus comprises a tray 16 on which a cartridge 10 is placed, a case 18 for receiving the tray 10, a deck base (not shown) installed inside the case 18 on which an optical disc D is placed, and a cover plate 22 coupled to an upper portion of the case 18.

A clamping hole 22a is formed at a central portion of the cover plate 22, and an end of a locker 24 which is fixed on the cover plate 22 is inserted into the clamping hole 22a. The locker 24 is coupled with a damper 26. The damper 26 chucks and/or releases a nonmagnetic portion of the optical disc D on a turn table (not shown) to/from the turn table.

As shown in FIG. 1, the cartridge 10 for accommodating the optical disc D includes a shutter 12. The shutter 12 is provided with a locking jaw 12a and is elastically supported by a spring 14. When the cartridge 10 is loaded inside of the case 18, the shutter 12 is opened by a shutter opening apparatus mounted on a lower surface of the cover plate 22.

The shutter opening apparatus includes a lever 28 pivotably mounted to the lower surface of the cover plate 22. The lever 28 has a protrusion 28a formed at the lower surface thereof which is inserted into a guiding slot 22b formed at the cover plate 22. At one end of the lever 28, a torsion spring 30 is installed. The torsion spring 30 returns the lever 28 to an initial position (shown in phantom line in FIG. 2).

After the cartridge 10 is accommodated onto the tray 16, as shown in FIGS. 1 and 2, the other end of the lever 28 contacts with the locking jaw 12a of the shutter 12. And when the tray 16 is advanced inside of the case 18 by means of a loading device (not shown), the lever 28 is pivoted along a guiding slot 22b, and the shutter 12 is accordingly opened. When the tray 16 is ejected from the case 18 by the loading device, the lever 28 is pivoted by the torsion spring 30, and the shutter 12 is returned to the initial position. Consequently, the cartridge 10 is closed.

However, since the prior art shutter on opening device is installed on the cover plate, this placement increases the overall size/volume of the optical disc recording and reproducing apparatus. In addition, there are many instances where the prior art shutter opening device is inadequate when the lever is not precisely contacting with the hook or locking jaw of the shutter, or it fails to contact with the same during the contacting process.

SUMMARY OF THE INVENTION

The present invention has been made to overcome above problems, and accordingly, it is an object of the present invention to provide a shutter opening apparatus for accurately opening a shutter of a cartridge accommodated onto the tray, and subsequently decreasing the size/volume of an optical disc recording and reproducing device.

Additional objects and advantages of the invention will be set forth in part in the description which follows and, in part, will be obvious from the description, or may be learned by practice of the invention.

To achieve the above and other objects of the present invention, an apparatus is provided for opening a shutter of a cartridge, including a tray to accommodate the cartridge, an opening section to open the shutter of the cartridge, a feeding section to feed the tray inside of the optical disc recording and reproducing apparatus, and a driving section to drive the opening section and the feeding section.

The tray is formed with a guide recess at an inner wall of a first longitudinal opening, and a mounting protrusion formed at a lower side thereof.

The opening section includes a worm shaft rotatably installed across the longitudinal opening, a bracket moved along the guide recess for opening the shutter of the cartridge, and a first bevel gear engaged with an end of the worm shaft. An end of the bracket is engaged with the shutter, while an other end thereof contacts with the feeding section. A guide protrusion is formed at the side of the bracket, and inserted into the guide recess.

The feeding section includes a slide bar. The slide bar is provided with a rack formed at a side thereof and engaged with the driving section, a second longitudinal opening into which the mounting protrusion is inserted, and an end which contacts with an end of the bracket. The slide bar moves from a first position to a second position by the operation of the bracket. A bias spring for biasing the slide bar toward the first position is disposed between the slide bar and the tray. The rack is separated from the driving section when the slide bar is at the first position, and engaged with the driving section when the slide bar is at the second position.

The driving section includes a motor installed at the inner portion of the case for generating a driving power, a second bevel gear rotated by the motor and engaged with the first bevel gear, and a loading gear engaged with the feeding section for feeding the feeding section to the inner portion of the case.

After the cartridge is accommodated on the tray, the motor is driven to rotate the worm shaft. And at this time, the bracket is moved along the guide recess to open the shutter while moving the slide bar from the first position to the second position. When the slide bar is moved to the second position, the loading gear is engaged with the rack, while the first and second bevel gears are separated from each other. Consequently, the tray is fed into the case.

According to the present invention, the shutter of the cartridge is opened outside of the optical disc recording and reproducing apparatus without a failure before the optical disc is loaded. Additionally, the volume of the optical disc recording and reproducing apparatus is reduced and the loading errors of the optical disc are also prevented.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
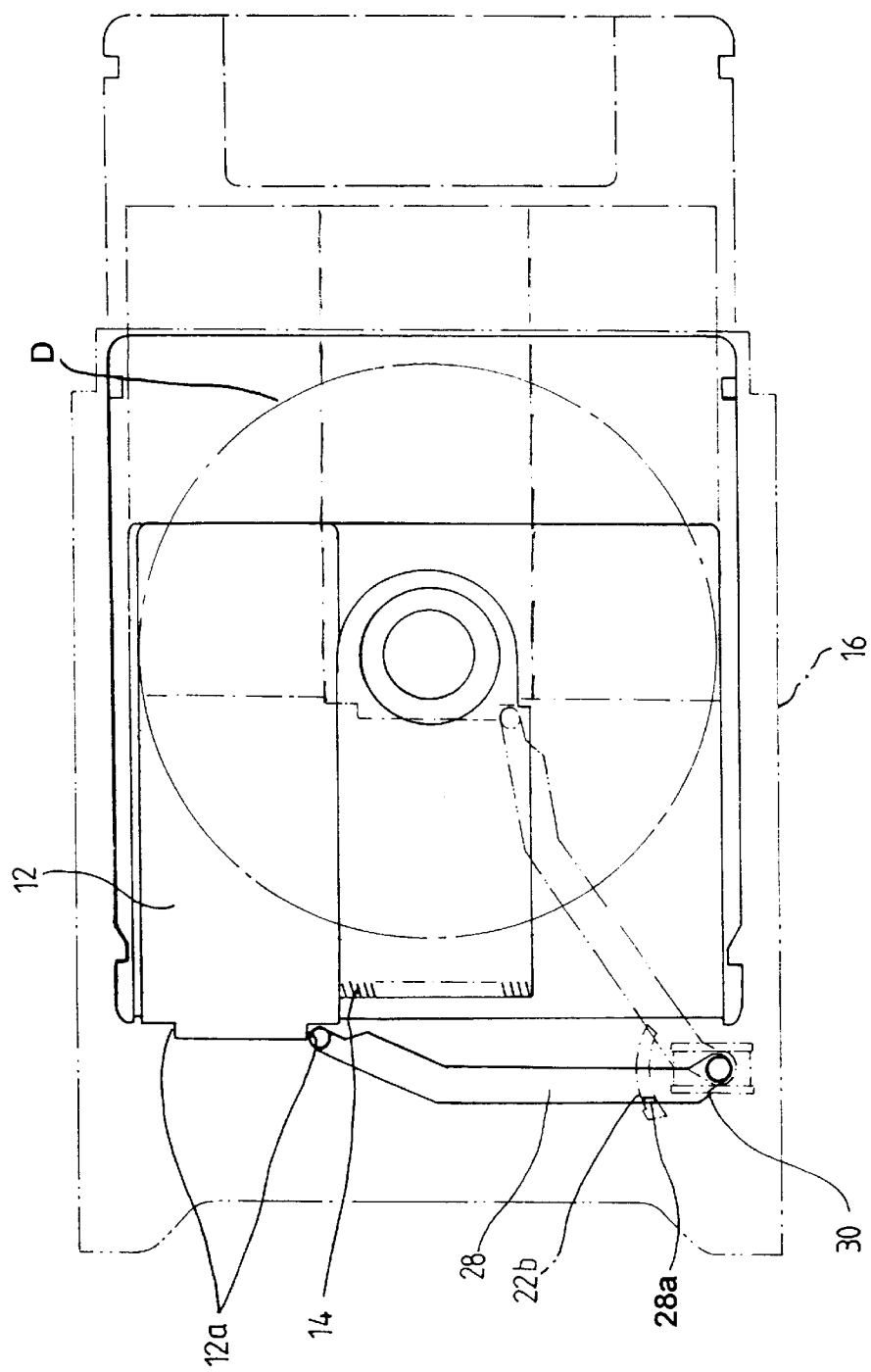
FIG. 1 is a perspective view showing a conventional optical disc recording and reproducing apparatus.
Figure 2:
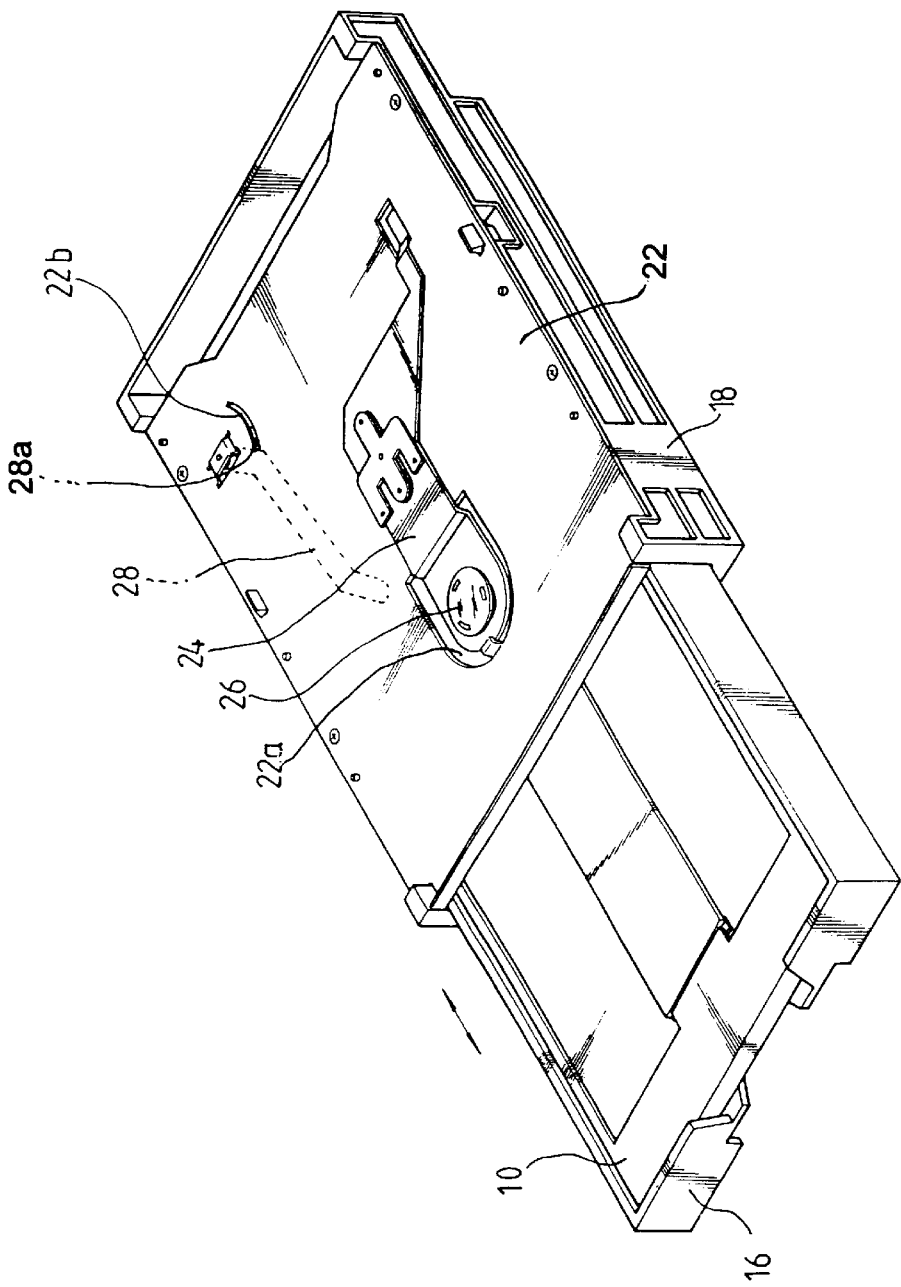
FIG. 2 is a view showing a conventional shutter opening apparatus for the optical disc recording and reproducing apparatus shown in FIG. 1.
Figure 3:
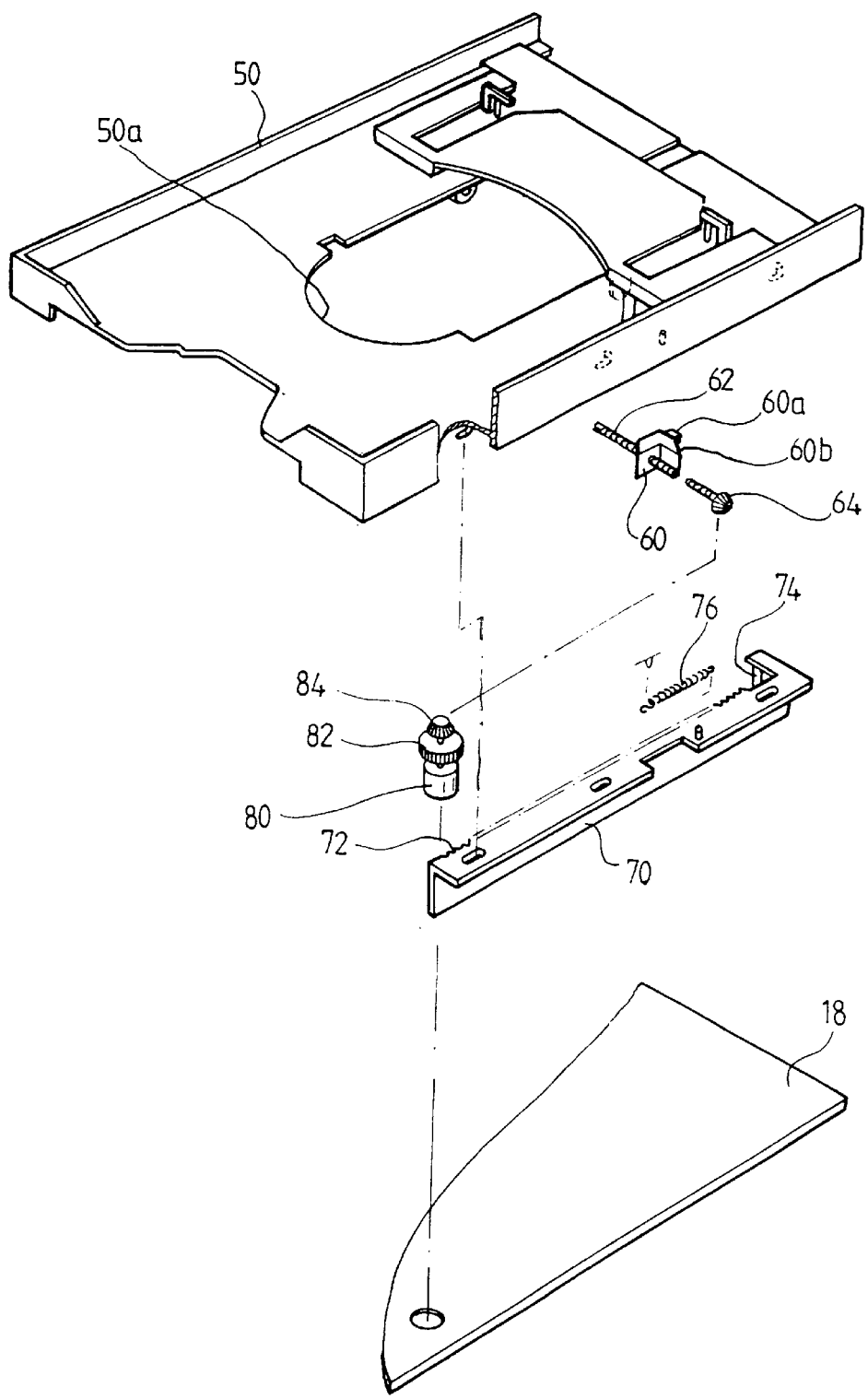
FIG. 3 is an exploded perspective view showing a shutter opening apparatus according to an embodiment of the present invention.

Reference will now made in detail to the present preferred embodiment of the present invention, examples of which are illustrated in the accompanying drawings, wherein like reference numerals refer to the like elements throughout. The embodiments are described below in order to explain the present invention by referring to the figures.

FIGS. 3 to 7 show a shutter opening apparatus according to a preferred embodiment of the present invention. In the figures, the shutter opening apparatus of the preferred embodiment comprises a tray 50 and an opening section for opening a shutter 12 of a cartridge 10. The tray 50 has a guide recess 50b formed at an inner wall of a first longitudinal opening 50a, and a mounting protrusion 52 formed at a lower side thereof.

The opening section includes a worm shaft 62 rotatably installed across the first longitudinal opening 50a, and a bracket 60 engaged with the worm shaft 62. The bracket 60 has an 'L' shape, one end to engage with a locking jaw 12a of the shutter 12 of the cartridge 10, and an inclined plane 60b formed at the other end thereof. At one side of the bracket 60, a guiding protrusion 60a to be inserted into the guide recess 50b is formed. The bracket 60 moves along the guide recess 50b by rotation of the worm shaft 62, and opens the shutter 12. On an end of the worm shaft 62, a first bevel gear 64 is mounted.

At other end of the bracket 60, (second instance) the inclined plane 60b, makes contact with a feeding section. The feeding section feeds the tray 50 inside of the case of the optical disc reproducing apparatus. The feeding section includes a slide bar 70 to contact with the inclined plane 60b so as to travels between a first and second position, and a bias spring 76 disposed between the tray 50 and the slide bar 70. When the slide bar 70 is separated from the bracket 60, the slide bar 70 is returned to the first position from the second position by the bias spring 76.

The slide bar 70 is formed with a second longitudinal opening 70a whereinto the mounting protrusion 52 of the tray 50 is inserted, and a rack 72 at one side thereof. One end of the slide bar 70 makes contact with the inclined plane 60b of the bracket 60b. When the bracket 60 opens the shutter 12 by the worm shaft 62, the one end thereof which has the inclined plane 60b is in contact with the slide bar 70 so that the slide bar 70 travels from the first position to the second position.

When the slide bar 70 travels to the second position, the slide bar 70 is engaged with a driving section for driving the opening section. The driving section drives the opening section and the feeding section, and comprises a second bevel gear 84 engageable with the first bevel gear 64 of the opening section, a loading gear 82 engageable with the rack 72, and a motor 80 for rotating the second bevel gear 84 and the loading gear 82 (FIG. 7) at various different times.

Figure 4:
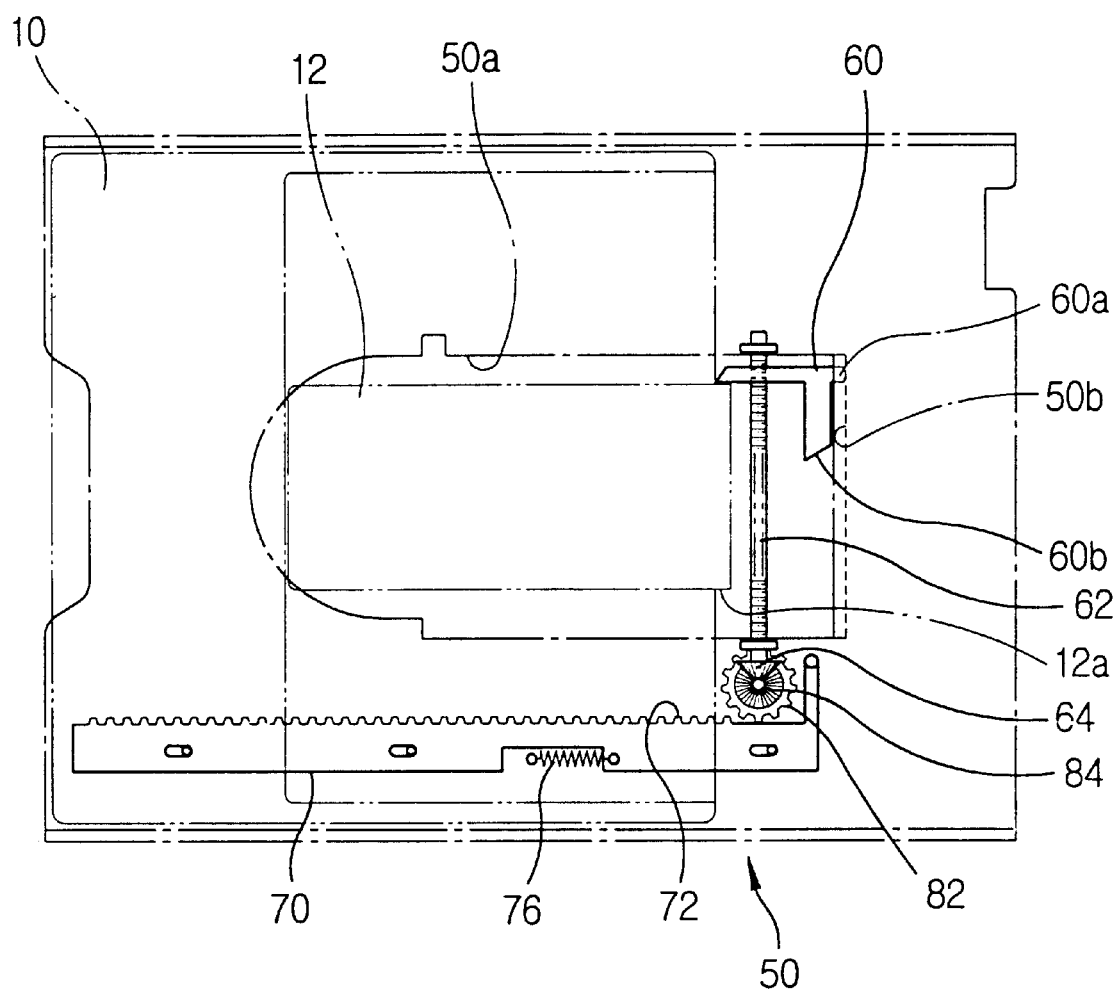
FIGS. 4 to 6 are plan views illustrating the operation of a shutter opening apparatus shown in FIG. 3 according to the embodiment of the present invention.

Hereinafter, an operation of the shutter opening apparatus according to the preferred embodiment will be described. FIG. 4 shows a state that the cartridge 10 is accommodated on the tray 50. In the figure, the first bevel gear 64 is engaged with the second bevel gear 84, and the end of the bracket 60 is engaged with the locking jaw 12a of the shutter 12. At this instance, as a user pushes a button such as an eject button (not shown), the motor 80 is driven, so as to rotate the second bevel gear 84. By doing so, the worm shaft 62 is rotated by the first bevel gear 64 engaged with the second bevel gear 84. At this time, the bracket 60 is moved along the guide recess 50b, and simultaneously, the shutter 12, engaged with the end of the bracket 60, is opened.

Figure 5:
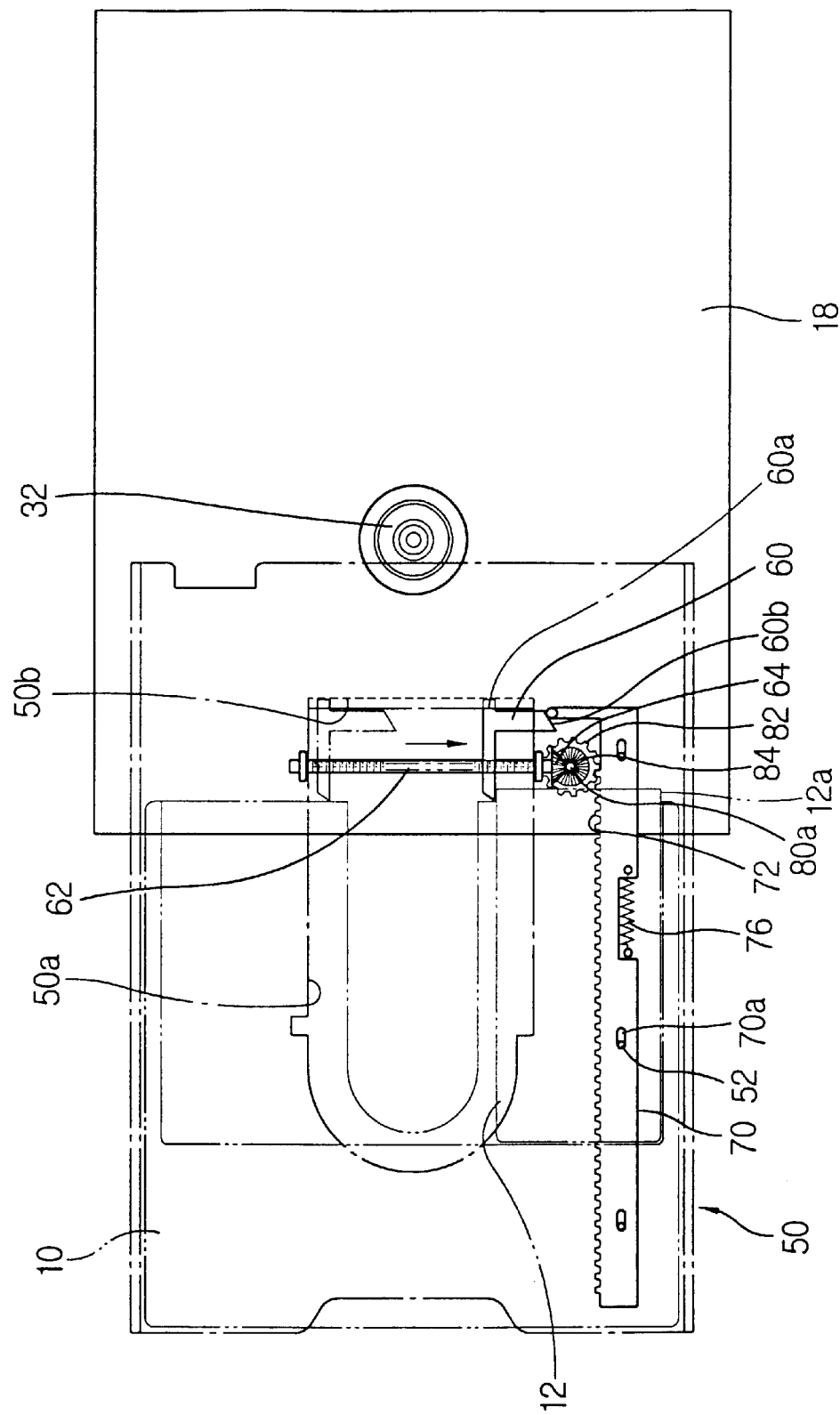

As shown in FIG. 5, as the shutter 12 is opened, the inclined plane 60b of the bracket 60 makes contact with the end of the slide bar 70. With this contact, the slide bar 70 travels to the second position from the first position. At this time, the loading gear 82 is engaged with the rack 72, and the first bevel gear 64 is separated from the second bevel gear 84.

Figure 6:
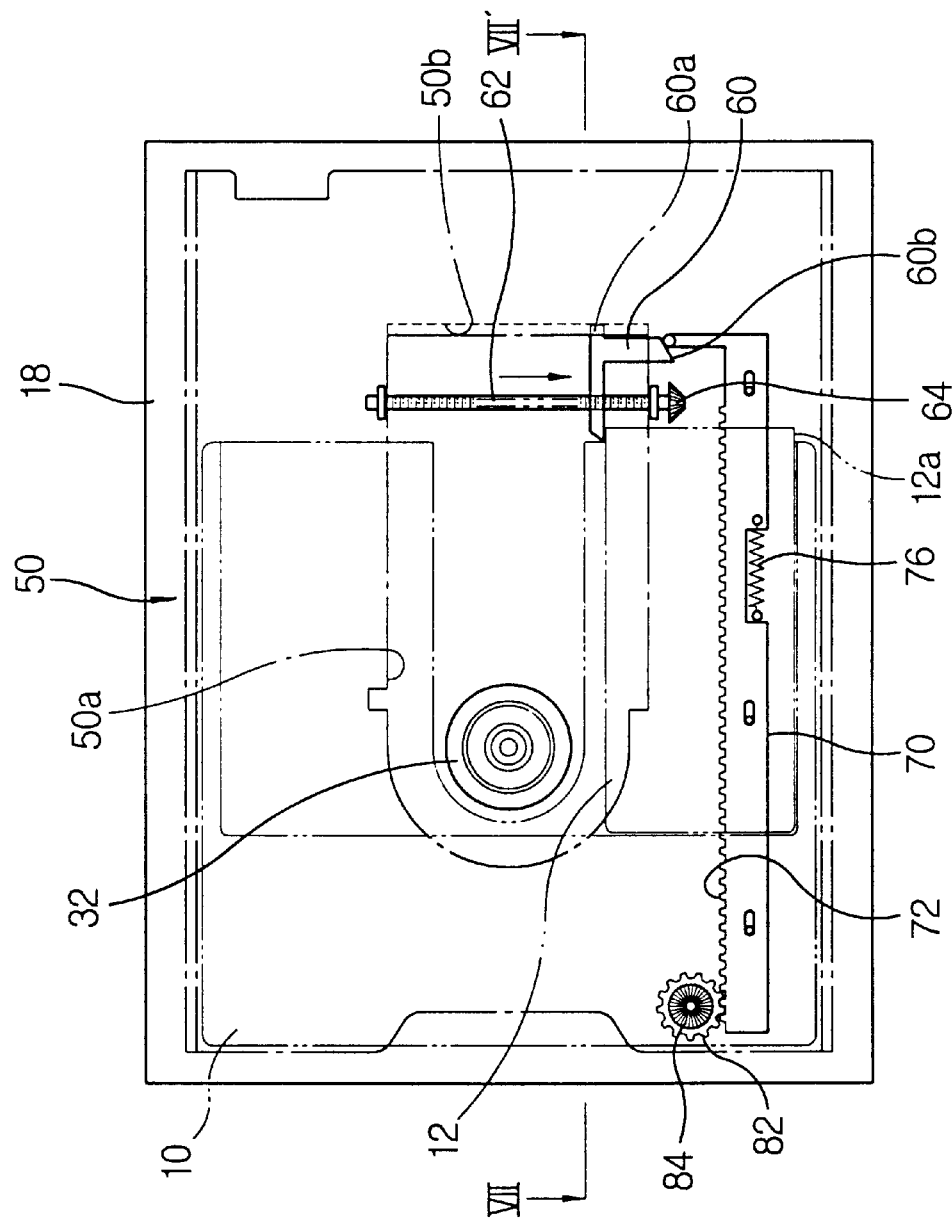
Figure 7:
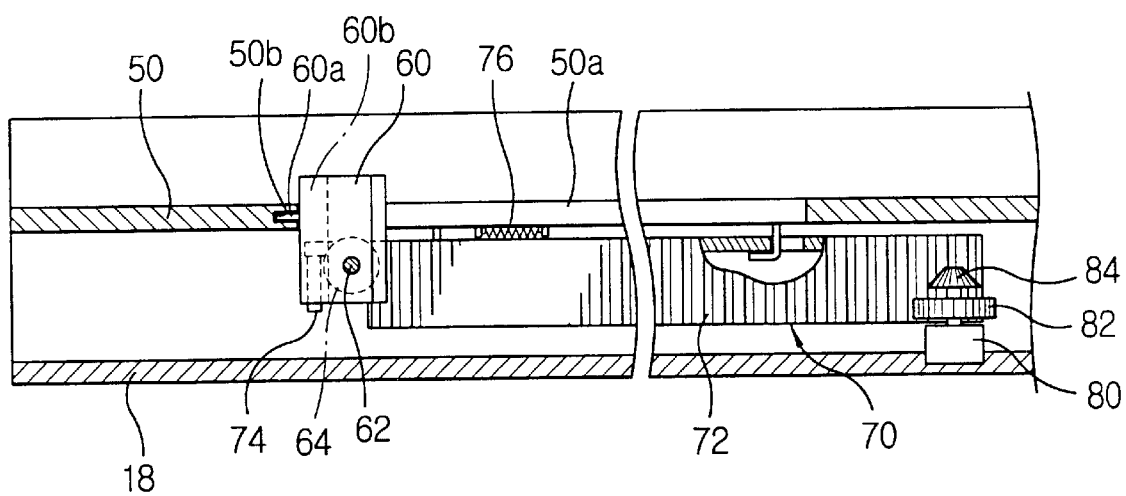
FIG. 7 is a sectional view taken from VII-VII' in FIG. 6.

After this, as shown in FIG. 6, the tray 50 is fed inside the case 18 by the rack 72 engaged with the loading gear 82. If the tray 50 is completely advanced inside the case 18, the motor 80 is stopped, and the optical disc D accommodated in the cartridge 10 is loaded on a turntable 32.

Conversely, the process by which the tray 50 is ejected is as follows. When the motor 80 is driven, the tray 50 is ejected from the case 18 by the rack 72 engaged with the loading gear 82. After the ejection of the tray 50, the slide bar 70 is moved to the first position from the second position by a biasing force of the bias spring 76. By doing so, the end of the slide bar 70 is separated from the rack 72 while the second bevel gear 84 is engaged with the first bevel gear 64. Then, the worm shaft 62 is rotated so that the bracket 60, engaged with the worm shaft 62, is moved to an initial position along the guide recess 50b. At the same time, the shutter 12, engaged with the end of the bracket 60, is closed.

According to the present invention described with the preferred embodiment as above, the shutter of the cartridge is successfully opened outside of the optical disc recording and reproducing apparatus before the optical disc is loaded. As the result, the optical disc recording and reproducing apparatus has a smaller size, and the loading errors of the optical disc are prevented.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for opening a shutter of a cartridge which contains a recording medium, wherein the recording medium is to be accessed by a recording and/or reproducing apparatus having a case, the apparatus comprising:
   a tray comprising
      a guide recess,
      a mounting protrusion formed at a lower side thereof, and
      a first longitudinal opening,
   wherein said tray receives the cartridge having the shutter, the guide recess being formed at an inner wall of the first longitudinal opening;
   means installed across the first longitudinal opening, for opening the shutter while moving along the guide recess;
   means engaged with said opening means, for feeding said tray inside the case of the recording and/or reproducing apparatus; and
   means installed at an inner portion of the case, for driving said opening means and said feeding means.

2. The apparatus as claimed in claim 1, wherein said opening means comprises:
   a worm shaft rotatably mounted across the first longitudinal opening;
   a bracket to open the shutter while being moved along the guide recess by rotation of the worm shaft; and
   a first bevel gear mounted on an end of the worm shaft.

3. The apparatus as claimed in claim 2, wherein the bracket has an 'L' shape, one end being engaged with the shutter upon loading of the cartridge in said tray, an inclined plane being formed at another end thereof, and a guide protrusion being provided at a side thereof and inserted into the guide recess.

4. The apparatus as claimed in claim 2, wherein said feeding means comprises:
   a slide bar movable between a first and a second position by the bracket and including
      a rack engageable with said driving means,
      a second longitudinal opening into which the mounting protrusion is inserted, and
      an end engageable with an end of the bracket; and
   a bias spring disposed between said tray and the slide bar, for biasing the slide bar toward the first position;
   wherein the rack disengages from said driving means when the slide bar is at the first position, and engages with said driving means when the slide bar is at the second position, and the end of the rack engages the end of the bracket as the bracket is moved along the guide recess to open the shutter and disengages from the end of the bracket as the bracket is moved along the guide recess so that the shutter closes.

5. The apparatus as claimed in claim 2, wherein said driving means comprises:
   a motor installed inside the case, for generating a driving power;
   a second bevel gear rotated by the motor and engaged with the first bevel gear when the slide bar is at the first position; and
   a loading gear engaged with said feeding means when the slide bar is at the second position, for feeding said feeding means and said tray inside the case.

6. An apparatus for opening a shutter of a cartridge which contains a recording medium, wherein the recording medium is to be accessed by a recording and/or reproducing apparatus having a case, the apparatus comprising:
   a tray comprising a first longitudinal opening corresponding to the shutter, said tray being movable from an external position relative to the case, where the cartridge is received, to an internal position relative to the case;
   an opening mechanism to open the shutter of the cartridge subsequent to said tray receiving the cartridge at the external position and while said tray remains at the external position; and
   a driving unit to drive said opening mechanism to open the shutter and enable the shutter to be closed.

7. The apparatus as claimed in claim 6, further comprising a feeding unit, to feed said tray between the external position and the internal position, wherein said driving unit drives said feeding unit.

8. The apparatus as claimed in claim 7, wherein movement of said opening mechanism to open or close the shutter alternately causes engagement of said driving unit with said opening mechanism and with said feeding unit.

9. The apparatus as claimed in claim 6, wherein said opening mechanism comprises:
   a worm shaft rotatably installed across the first longitudinal opening;
   a bracket engaging the worm shaft and having a first end to contact a connecting portion of the shutter, to slide across the first longitudinal opening based upon rotation of the worm shaft, thereby opening the shutter; and
   a first gear mounted on an end of the worm shaft, to engage said driving unit until the shutter has been opened by the bracket by at least a predetermined amount.

10. The apparatus as claimed in claim 9, wherein:
    said tray includes a guide recess formed along a side of the first longitudinal opening closest to the case; and
    the bracket includes a guiding protrusion extending in the guide recess, to guide the bracket relative to said tray.

11. The apparatus as claimed in claim 9, further comprising a feeding unit to feed said tray between the external position and the internal position, wherein:
    said feeding unit includes
       a slide bar movable between a first position and a second position relative to said tray and having a rack engageable with said driving unit to move said tray between the external position and the internal position, and a contacting portion, and
       biasing means for biasing the slide bar to the first position;
    the bracket has a second end with an oblique plane relative to a direction of motion of the bracket;
    wherein the oblique plane of the bracket contacts the contacting portion of the slide bar when the bracket has moved across the first longitudinal opening to open the shutter by at least the predetermined amount, to move the slide bar from the first position to the second position upon motion to completely open the shutter; and
    the first gear disengages from said driving unit and the rack engages said drive unit, as the slide bar moves from the first position to the second position.

12. The apparatus as claimed in claim 11, wherein:
    the slide bar further includes a second longitudinal opening parallel to the first longitudinal opening; and
    said tray further includes a mounting protrusion to extend through the second longitudinal opening to guide and limit an amount of motion of the slide bar relative to said tray.

13. The apparatus as claimed in claim 11, wherein said driving unit comprises:
   a motor installed at an interior region of the case; and
   a second gear mounted on a shaft and rotated by the motor, to engage the first gear until the shutter has been opened by the bracket by at least the predetermined amount; and
   a loading gear mounted on the shaft between the motor and the second gear, and engageable with the rack of the slide bar, to move said tray between the external position and the internal position;
   wherein the rack engages the loading gear as the slide bar moves from the first position to the second position.

14. The apparatus as claimed in claim 9, wherein said driving unit comprises:
   a motor installed at an interior region of the case; and
   a second gear rotated by the motor, to engage the first gear until the shutter has been opened by the bracket by at least the predetermined amount.

15. The apparatus as claimed in claim 14, wherein the first and second gears are bevel gears.

16. The apparatus as claimed in claim 6, wherein:
   the case further comprises an opening through which the tray moves between the external position and the internal position, and
   said driving unit drives said opening mechanism to open the shutter while said tray remains at the external position and prior to the tray moving through the opening to the internal position.

17. A method of opening a shutter of a cartridge which contains an optical recording medium, wherein the optical recording medium is to be accessed by a recording and/or reproducing apparatus having a case, the method comprising:
   loading the cartridge with the optical recording medium on a tray at a position extending from the case;
   opening the shutter of the cartridge while the tray remains at the position using a driving unit; and
   feeding the tray with the cartridge having the shutter opened and the optical recording medium into the case for access by the recording and/or reproducing apparatus using the driving unit.

18. The method of claim 17, wherein said opening the shutter comprises:
   engaging the shutter with an engaging unit, and
   sliding the engaging unit along a bar following a bottom of the shutter.

19. The method of claim 18, wherein
   said opening the shutter further comprises disengaging the driving unit from the engaging unit after the shutter is opened, and
   said feeding the tray comprises engaging the tray after the engaging unit is disengaged in order to feed the tray into the case.

20. The method of claim 19, wherein the bar is roughly parallel to the bottom of the shutter.

* * * * *

UNITED STATES PATENT AND TRADEMARK OFFICE
CERTIFICATE OF CORRECTION

PATENT NO. : 6,560,186 B2
DATED : May 6, 2003
INVENTOR(S) : Cheol-sung Yeon

It is certified that error appears in the above-identified patent and that said Letters Patent is hereby corrected as shown below:

<u>Title page,</u>
Item [54], please change "APPARATUS AND METHOD WITH A DRIVING MECHANISM FOR OPENING A SHUTTER OF A CARTRIDGE" to
-- APPARATUS AND METHOD FOR OPENING A SHUTTER OF A CARTRIDGE --

Signed and Sealed this

Eighteenth Day of November, 2003

JAMES E. ROGAN
*Director of the United States Patent and Trademark Office*